United States Patent Office 3,426,013
Patented Feb. 4, 1969

3,426,013
DIFLUORAMINATED DIALDEHYDE CELLULOSE AND NITRIC ACID ESTERS THEREOF
Henryk Zenftman, West Kilbride, and Donald Calder, Ardrossan, Scotland, assignors, by mesne assignments, to the United States of America as represented by the Secretary of the Navy
No Drawing. Filed May 31, 1963, Ser. No. 284,744
Claims priority, application Great Britain, June 1, 1962, 21,330/62
U.S. Cl. 260—222        8 Claims
Int. Cl. C08b *21/12, 15/06;* C06b *5/00*

The present invention relates to new cellulose derivatives containing difluoramino groups and the manufacture thereof.

According to the present invention difluoraminated derivatives of cellulose are prepared by treating dialdehyde cellulose with liquid difluoramine in an inert atmosphere in the presence of an acid catalyst.

By the term "dialdehyde cellulose" is meant cellulose which has been oxidised in such a manner and to such an extent that the

groups in the 2 and 3 positions of at least a portion of the anhydroglucose units have been converted to aldehyde groups thereby breaking the anhydroglucose rings. The term also includes derivatives of such cellulose such as, for example, esters or ethers in which aldehyde groups are present. Anhydroglucose units thus oxidised are hereinafter termed "dialdehyde units." The term "dialdehyde unit" includes oxidised anhydroglucose units containing one or both aldehyde groups in the free state as well as oxidised anhydroglucose units containing aldehyde groups masked by reaction with water, with residual hydroxyl groups of the cellulose or with other aldehyde groups. By "inert atmosphere" is meant an atmosphere free from any constituent such as oxygen which reacts with the difluoramine.

The maximum theoretically possible content of $NF_2$ groups is reached when four $NF_2$ groups have been introduced into each dialdehyde unit in the following manner

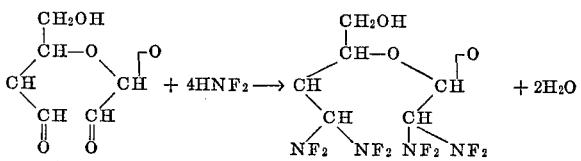

The practical limit for the number of $NF_2$ groups has been found to lie well below four per dialdehyde unit. The reason for this is not completely understood but a marked difference in the rates of reaction of the two aldehyde groups of the dialdehyde unit is suspected.

We have found concentrated sulphuric acid to be a suitable catalyst for the reaction. Strong acid will, however, degrade dialdehyde cellulose and in order to avoid excessive degradation we have found it advantageous to carry out the reaction in two stages. In a first stage, the dialdehyde cellulose is treated with difluoramine alone and in the second stage with difluoramine in the presence of concentrated acid. The reaction in the first stage is continued for a sufficient period to yield an intermediate product which, although not explosive, has a sufficiently high content of difluoramino groups to render it more resistant than dialdehyde cellulose to acid degradation. This product is thought to be an addition product of the dialdehyde cellulose with the difluoramine in which some of the original aldehyde groups are converted to —CH.(OH).$NF_2$.

The use of difluoramine, in excess of the stoichiometric requirement for complete reaction and low reaction temperature, also helps to minimise acid degradation of the dialdehyde cellulose. The reaction may conveniently be carried out at about —23° C., the boiling point of difluoramine at atmospheric pressure, by refluxing the difluoramine at atmospheric pressure during the reaction.

The products of the reaction having an average of one or more difluoramino groups per molecular chain unit are useful explosives and can be used advantageously as energetic constituents of rocket propellants.

It is possible to prepare more energetic explosive products from those difluoraminated reaction products which contain free hydroxyl groups in the molecule by esterifying the hydroxyl groups with certain acids such as, for example, nitric acid.

It will be understood therefore that our invention includes cellulose derivatives in which at least a portion of the units in the molecular chain consists of difluoraminated units, esters of such cellulose derivatives and the aforedescribed method of producing such derivatives.

The invention is further illustrated by the following examples in which all parts and percentages are by weight.

EXAMPLE 1

A dialdehyde cellulose was prepared in known manner by treating cotton linters at room temperature for 6 days with an excess of a solution containing 9.6 parts paraperiodic acid ($HIO_4.2H_2O$), 7.9 parts sodium acetate ($NaC_2H_3O_2.3H_2O$) and 100 parts water. The product was dried under vacuum over phosphorus pentoxide at room temperature.

0.5 g. of the dried dialdehyde cellulose was placed in a 25 cc. flask having 3 necks respectively connected to a reflux condenser, a nitrogen inlet and a dropping funnel. The system was flushed with nitrogen and the reflux condenser was cooled to approximately —80° C. Gaseous difluoramine was introduced through a side arm of the condenser into the reaction vessel and maintained under reflux so as to completely immerse the dialdehyde cellulose in the refluxing liquid. During the reaction a current of nitrogen, which facilitated mixing of the reagents, was maintained through the liquid in the flask. After the difluoramine had been refluxed for 3 hours, 1.5 cc. of 96% sulphuric acid were added from the dropping funnel and the reaction was continued for 50 minutes. The temperature, which throughout the reaction had been near to that of the refluxing medium (—23° C.), was allowed to reach room temperature and all the excess difluoramine was distilled off. The residue in the flask consisted of a white solid suspended in sulphuric acid. The contents of the flask were poured over ice and the supernatant liquor was decanted from the solid. The residue was thoroughly washed with a large quantity or water and dried in a vacuum desiccator over phosphorus pentoxide.

The white, solid product decomposed on heating without melting. When ignited it flashed with a bright white flame. On analysis it was found to contain 8.6% nitrogen and 23.2% fluorine which corresponded to an average degree of substitution of approximately 1.4$NF_2$ groups per unit of the polymeric chain. It was insoluble in water, benzene, toluene and chloroform but was soluble or highly swollen in ethanol, acetone and cyclohexanone. It was soluble to a limited extent in ethanol/benzene and ethanol/ether mixtures and swelled appreciably in butanol.

EXAMPLE 2

A dialdehyde cellulose was prepared by oxidising 6 g. of cotton linters for 72 hours at room temperature (20° C.

approx.) in the dark. The oxidising solution had a pH of 4.25 and contained 11.4 g. paraperiodic acid (HIO₄.2H₂O)

8.5 g. sodium acetate (NaC₂H₃O₂.3H₂O) and water to give a solution volume of 100 cc. Titration of the supernatant liquid indicated that 94.5% of the amount of periodic acid theoretically required for oxidation of all the glucose units of the cellulose to dialdehyde units had been consumed. The dialdehyde cellulose was filtered off, washed thoroughly with distilled water and dried in vacuo over phosphorus pentoxide at room temperature. This product was shown by oximation to contain 1.9 aldehyde groups per anhydroglucose unit.

0.539 g. of the above dried dialdehyde cellulose was treated with liquid difluoramine at atmospheric pressure for 9 hours as described in Example 1. 1.5 cc. of 92% sulphuric acid was then added dropwise and the reaction continued at the reflux temperature of difluoramine for 20 minutes. After allowing excess difluoramine to evaporate at room temperature the residual mixture was poured on ice. The solid product was filtered off, washed with distilled water and dried over phosphorus pentoxide in vacuo. The product was 0.569 g. of a white powder which on analysis was found to contain 10.18% nitrogen and 25.64% of fluorine. The degree of substitution based on nitrogen content was 1.7NF₂ groups per unit of the polymeric chain.

When heated in an open ended glass tube so that the rate of temperature increase was 5° C. per minute, a small sample of the difluoraminated dialdehyde cellulose exploded at 146° C. In a test in which a mild steel hammer weighing ½ kg. was allowed to fall on a small sample placed on a mild steel anvil, explosion occurred at fall heights of 40–60 cm.

EXAMPLE 3

0.244 g. of the same dialdehyde cellulose as was used in Example 2 was reacted with difluoramine at atmospheric pressure at the reflux temperature for 1 hour. 92% sulphuric acid was then added and refluxing continued for 20 minutes. After allowing the difluoramine to evaporate at room temperature the residue was poured on ice. Only a trace of solid product was obtained. The very low yield was attributed to degradation of the dialdehyde cellulose by the strong acid which occurred because the initial reaction period before the acid addition was too short to form an acid resistant difluoraminated product.

EXAMPLE 4

0.155 g. of the same dialdehyde cellulose as was used in Example 2 was reacted with difluoramine at atmospheric pressure for 8 hours. The difluoramine was allowed to evaporate off and the last traces were removed under reduced pressure to give 0.194 g. of a white solid product containing 5.9% nitrogen and 10.9% fluorine. This product was insufficiently difluoraminated to be a useful energetic ingredient of explosives.

What we claim is:
1. Difluoraminated dialdehyde cellulose.
2. Nitric acid esters of difluoraminated dialdehyde cellulose.
3. A process for the preparation of difluoraminated derivatives of cellulose which comprises reacting dialdehyde cellulose with liquid difluoramine in an inert atmosphere in the presence of an acid catalyst.
4. A process in accordance with claim 3 wherein the acid catalyst is concentrated sulphuric acid.
5. A process in accordance with claim 3 which comprises treating dialdehyde cellulose in a first reaction stage with difluoramine for a period sufficient to yield an intermediate having a sufficiently high content of difluoramino groups to render it more resistant than dialdehyde cellulose to degradation by strong acids, adding a concentrated acid catalyst and in a second reaction stage continuing said treatment with difluoramine for a period sufficient to yield a product having an average degree of difluoramination of at least one difluoramino group per molecular chain unit.
6. A process in accordance with claim 3 wherein the reaction is carried out using difluoramine in excess of the stoichiometric requirement.
7. A process in accordance with claim 3 wherein the reaction is carried out at atmospheric pressure at the boiling point of difluoramine.
8. A process in accordance with claim 3 wherein the difluoramine is maintained under reflux during the reaction.

References Cited

Farber: Astronautics, August 1960, pp. 34, 40 and 42

LELAND A. SEBASTIAN, *Primary Examiner.*

U.S. Cl. X.R.

260—584, 466; 149—96, 109